US012752855B2

(12) United States Patent
Marquez Duran et al.

(10) Patent No.: US 12,752,855 B2
(45) Date of Patent: Oct. 6, 2026

(54) STRUCTURAL MEMBERS FOR A VEHICLE AND METHODS

(71) Applicant: AUTOTECH ENGINEERING S.L., Amorebieta-Etxano (ES)

(72) Inventors: Sergi Marquez Duran, Rajadell (ES); Mireia Illana Gregori, Barcelona (ES); Jordi Herranz Tomas, Sant Boi de Llobregat (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 437 days.

(21) Appl. No.: 18/276,629

(22) PCT Filed: Feb. 9, 2022

(86) PCT No.: PCT/EP2022/053119
§ 371 (c)(1),
(2) Date: Aug. 9, 2023

(87) PCT Pub. No.: WO2022/171665
PCT Pub. Date: Aug. 18, 2022

(65) Prior Publication Data
US 2024/0116576 A1 Apr. 11, 2024

(30) Foreign Application Priority Data
Feb. 11, 2021 (EP) .................................... 21382108

(51) Int. Cl.
*B62D 25/04* (2006.01)
*B23K 26/00* (2014.01)
(Continued)

(52) U.S. Cl.
CPC .......... *B62D 25/04* (2013.01); *B23K 26/0093* (2013.01); *B23K 26/26* (2013.01); *B62D 27/023* (2013.01); *B62D 29/007* (2013.01)

(58) Field of Classification Search
CPC .. B23K 26/0093; B23K 26/244; B23K 26/26; B23K 26/30; B23K 26/32;
(Continued)

(56) References Cited

U.S. PATENT DOCUMENTS 4,001,543 A * 1/1977 Bove .................... B23K 26/282
219/121.74
8,967,703 B2 * 3/2015 Wawers ............... B62D 21/157
296/193.06
(Continued)

FOREIGN PATENT DOCUMENTS

EP 2056979 B1 * 7/2013 ............. B62D 25/04
EP 2617509 B1 4/2023
(Continued)

OTHER PUBLICATIONS

DE 102015218454 A1 (Year: 2017).*
(Continued)

*Primary Examiner* — Lori Lyjak
(74) *Attorney, Agent, or Firm* — Squire Patton Boggs (US) LLP

(57) ABSTRACT

Structural members for a vehicle at least partially configured for supporting bending loads and methods for manufacturing such structural members are provided. A structural member includes a main piece with a substantially U-shaped cross-section comprising a bottom, a first side wall and a second side wall, wherein the main piece comprises a region configured for supporting bending loads. The structural member includes a first patch having a first patch edge and an opposite second patch edge, wherein the first patch is attached to the main piece by continuous laser welding inside the first patch substantially along the first patch edge and along the second patch edge at least in the region configured for supporting bending loads.

20 Claims, 5 Drawing Sheets

(51) Int. Cl.

| | |
|---|---|
| ***B23K 26/26*** | (2014.01) |
| ***B62D 27/02*** | (2006.01) |
| ***B62D 29/00*** | (2006.01) |

(58) Field of Classification Search

CPC ........ B23K 2101/006; B23K 2101/185; B23K 2103/04; B23K 2103/18; B62D 25/04; B62D 27/023; B62D 29/007

See application file for complete search history.

(56) References Cited

U.S. PATENT DOCUMENTS

| | | | | |
|---|---|---|---|---|
| 10,486,750 | B2 * | 11/2019 | Hamada | B60J 5/0443 |
| 2009/0242086 | A1 * | 10/2009 | Thomas | C21D 8/04<br>148/654 |
| 2013/0192726 | A1 * | 8/2013 | Chen | C21D 1/673<br>148/333 |
| 2014/0196359 | A1 * | 7/2014 | Anitescu | C11C 3/00<br>44/388 |
| 2015/0337406 | A1 * | 11/2015 | Muhr | C25D 17/00<br>266/160 |
| 2015/0353146 | A1 * | 12/2015 | Bohner | C22C 21/06<br>148/695 |
| 2016/0083016 | A1 * | 3/2016 | Imada | B62D 25/04<br>296/203.01 |

FOREIGN PATENT DOCUMENTS

| | | | |
|---|---|---|---|
| JP | 2009-019229 | A1 | 1/2009 |
| JP | 6172426 | B1 | 8/2017 |
| WO | WO 2020/003900 | A1 | 1/2020 |

OTHER PUBLICATIONS

AU 2005243819 A1 (Year: 2005).*

CN 111332367 A (Year: 2020).*

International Search Report and Writtent Opinion mailed May 5, 2022 for International Application No. PCT/EP2022/053119, 10 pages.

* cited by examiner

STRUCTURAL MEMBERS FOR A VEHICLE AND METHODS

CROSS-REFERENCE

The present application is a National Stage filing under 35 U.S.C. § 371 of International Patent Application No. PCT/EP2022/053119, filed Feb. 9, 2022, which claims the benefit of and priority to European Patent Application No. 21382108.5, filed Feb. 11, 2021, the contents of all of which are hereby incorporated by reference in their entireties for all purposes.

The present disclosure relates to structural members for a vehicle framework, the structural members being at least partially configured for supporting bending loads. The present disclosure further relates to methods for manufacturing such structural members.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars. The structural skeleton is also designed to be as lightweight as possible in order to reduce the emission of pollutants such as CO 2 to the environment.

The structural skeleton of a car may for instance include bumpers, pillars (e.g. A-pillar, B-pillar, C-pillar), side impact beams and rocker panels. These and other structural members may have one or more regions with a substantially U-shaped (also known as "hat"-shaped) cross section. These structural members may be manufactured in a variety of ways and may be made of a variety of materials. As indicated above, lightweight materials that improve the integrity of the vehicle during a crash while also improving the energy absorption are desired.

In the automotive industry it is generally known that at least a number of the structural members of the skeleton of a vehicle are made of ultra-high strength steels (UHSS), exhibiting an optimized maximum strength per weight unit and advantageous formability properties.

Ultra-high strength steels (UHSS) in the present disclosure may be regarded as steels having an ultimate tensile strength of at least 1000 MPa. UHSS may obtain such a high tensile strength after a Hot Forming process. Some UHSS require rapid cooling to obtain a martensitic microstructure and the corresponding high ultimate tensile strength. Other UHSS can obtain the high ultimate tensile strength with relatively slow cooling or even air cooling ("air hardening"). Some UHSS do not require hot forming and corresponding austenizaiton to obtain the high ultimate tensile strength, and instead have and retain a high strength after cold forming.

UHSS may exhibit ultimate tensile strength of as high as 1500 MPa, or even 2000 MPa or more, particularly after a press hardening operation. In such an operation a steel blank is heated to above an austenization temperature, in particular to above Ac3, to substantially fully austenize the blank. After heating to above this temperature for a period of time, the blank is subjected to a pressing operation in which the blank is deformed. At the same time, the blank is rapidly cooled such that the blank is substantially "fully hardened" and a martensitic microstructure is obtained. Press hardening may also be referred to as "hot stamping", or when rapid cooling is used "Hot Forming Die Quenching" (HFDQ).

Besides using appropriate materials, suitable properties in terms of crash behaviour and reduced weight can be conferred to the structural members of a vehicle by e.g. using patch welding. For instance, welding a first patch to a main piece reinforces the main piece where necessary without adding additional undesired weight. A blank to which a patch has been added is sometimes referred to as a "patchwork blank". This is to distinguish from "tailor welded blank", in which blanks are joined to each other through edge to edge welding.

Usually, patches are welded to the main piece by spot welding, which is a well-known and broadly used welding technology in the automotive field. However, spot welding has several limitations.

These limitations include a certain minimum distance between the spot welds (e.g. between 5 and 20 mm), a certain minimum spot weld overlap region (e.g. about 25 mm) and a necessary time to position the plates and the spot welding tool (e.g. around 4 s). These distances and times vary depending on the materials and thicknesses of the patch and the piece to be welded.

Another disadvantage of spot welding is that, as spot welding is a two-side access technology and the welding gun cannot easily access the region where the patch has been positioned, patches are sometimes very difficult to weld.

In addition, the welded piece and patch, this assembly also known as patchwork, may undergo several post-processing steps which may damage or destroy some spot welds due to twisting or bending of the patchwork. Thus, the patchwork may be disassembled. For example, if hot forming is applied to a patchwork blank, the heat of the furnace (and/or the subsequent deformation) may distort the patchwork blank and some spot welds may loosen or break. This may happen even if the number of spot welds performed to join the patch and the piece have been carefully selected.

Another technology that has been used is laser welding. In laser welding, an imitation of spot welding is generally done, i.e. laser stitches are provided. Laser stitches are local, generally straight, welds. When several laser stitches are provided, several separate welds are provided, thereby imitating welds resulting from spot welding.

Document WO 2020/003900 A1 discloses the use of laser welding for joining a first plate-shaped member and a second plate-shaped member, the laser stitches being provided longitudinally along a centre region of the second plate-shaped member. This document also discloses the use of laser-arc hybrid welding outside and along the longitudinal edges of the second plate-shaped member.

The present disclosure aims to provide improvements in patch welding technology.

SUMMARY

In a first aspect, a structural member for a vehicle framework, the structural member being at least partially configured for supporting bending loads is provided. The structural member comprises a main piece and a first patch. The main piece has a substantially U-shaped cross-section comprising a bottom, a first side wall and a second side wall. The main piece further comprises a region configured for supporting bending loads. The first patch has a first patch edge and an opposite second patch edge. The first patch is attached to the main piece by continuous laser welding substantially along the first patch edge and along the second patch edge at least in the region configured for supporting bending loads.

With at least two patch edges joined by continuous laser welding, seamless merging of the patch and the main piece in the continuously laser welded region may be obtained.

This enables the patch and the main piece to work together as a single entity at least in the region configured for supporting bending loads.

Therefore, the behaviour of the structural member, e.g. during a crash, can be improved. As the patch and the main piece may act as a single entity, the reinforcement obtained may be enhanced, e.g. in comparison with a patchwork welded by spot welding and/or laser stitching. The strength and deformation behaviour of the resulting component may be improved compared to a same component of the same material and thickness but wherein the patchwork blank was formed by spot welding.

Furthermore, continuous laser welding enables the components of the patchwork not to be separated in the welded region in case of e.g. the abovementioned crash.

Throughout this disclosure, a patch should be understood as a piece of material that, when attached to a main piece, the entire patch is encompassed within the boundaries of the main piece. I.e. a patch may completely overlap a main piece of material or vice versa. The overlapping of the main piece with an entire patch enables the patch and the main piece to work as a single piece once continuous laser welding has been applied.

These above benefits also apply to the example of introducing the patchwork blank into a furnace commented above. If the spot welds break, the patchwork can no longer be used. Continuous laser welding may avoid or at least reduce this problem.

In general, continuous laser welding has been found to be particularly advantageous for structural members supporting bending loads.

Components or regions in frameworks of cars that are particularly subjected to bending loads include: A pillar and B pillar upper or middle sections, rear rails, (central longitudinal) tunnels, floors, hinge pillars, rocker areas, and door rings. The examples disclosed herein may be particularly used in these components.

In some examples, the first patch may be attached to the region configured for supporting bending loads of the main piece by continuous laser welding along all the edges of the patch. In this case, the behavior of the patchwork may be further improved, as all the edges of the patch are continuously laser welded. This enables a greater capacity of the patchwork to work as a single unity.

As a minimum distance between spot welds is not required, the size of the patch can be further reduced. Therefore, a more lightweight structural member may be obtained.

In some examples, the first patch may extend over the bottom, the first side wall and the second side wall of the main piece.

In one example, the first patch may extend over the first side wall at least a 10% of a height of the first wall and the first patch extends over the second side wall at least a 10% of a height of the second side wall. In some examples, the first patch may extend over the first and/or second side wall at least 25% of a height of the corresponding side wall, and more specifically between 25 and 50% of a height of the corresponding side wall.

These examples reflect the fact that the greater the extension of the patch over the side walls of the main piece, the greater the reinforcement and the better the behaviour of the patchwork may be, e.g. in a collision.

In another example, a first edge of the first patch may substantially extend along a first junction of the first side wall and the bottom of the main piece. Also, a second edge of the first patch may extend along a second junction of the second side wall and the bottom of the main piece.

In this case, continuous laser welding of the patch enables a good behaviour of the patchwork when the structural member is subjected to bending loads while at the same time enabling significant weight reduction.

In some examples, a second patch may be provided. The second patch has a first patch edge and an opposite second patch edge, wherein the second patch is attached to the main piece by continuous laser welding along the first patch edge and the second patch edge at least in the region configured for supporting bending loads.

Having more than one patch attached to the main piece may increase versatility, efficiency and optimization of the structural member. For instance, the number, size and position of attachment of the patches can be selected in order to meet design requirements of the structural member and to provide specific desirable kinematic behaviour.

In general, having more than one patch enables the structural member to be suitably reinforced (i.e., one or more of the aforementioned advantages due to continuous laser welding are acquired) where appropriate without unnecessarily increasing the weight of the structural member.

In some examples, the main piece may be made of hardened steel. The first patch and/or the second patch may be made of a more ductile material than hardened steel. By having a patch that is more ductile than the main piece, the rupture of the main piece during a crash may be avoided or may occur only after a significantly high degree of deformation. As the main piece and the patch are attached by continuous laser welding, the main piece acquires some of the ductility provided by the patch. This enhancement in ductility of the structural member can be higher than e.g. in case that the patch is more ductile than the main piece and the patchwork is attached by common spot welding. This is due to the fact that spot welding does not enable the patchwork to work as a single unity.

Furthermore, due to the ductility provided by one or more patches, the structural member may be able to absorb more energy in case of a collision. Therefore, the behaviour of the structural member may also be better in this regard.

One or more patches more ductile than the main piece welded by continuous laser welding to the main piece may reinforce the main piece at the same time that deformation and energy absorption abilities may be provided to the main piece. A main piece, e.g. a hardened steel piece, may not otherwise obtain these capabilities.

In a further aspect, a structural member for a vehicle framework, the structural member being at least partially configured for supporting bending loads is provided. The structural member comprises a main piece and a first patch. The main piece has a substantially U-shaped cross-section comprising a bottom, a first side wall and a second side wall. The main piece further comprises a region configured for supporting bending loads. The first patch has a first patch edge and an opposite second patch edge. The first patch is attached to the main piece by continuous laser welding inside the first patch substantially along the first patch edge and along the second patch edge at least in the region configured for supporting bending loads.

In some examples, the first patch may be attached to the region configured for supporting bending loads of the main piece by continuous laser welding inside the first patch along all the edges of the patch.

In some examples, a second patch may be provided. The second patch has a first patch edge and an opposite second patch edge, wherein the second patch is attached to the main piece by continuous laser welding inside the second patch along the first patch edge and the second patch edge at least in the region configured for supporting bending loads.

All the effects and advantages of the first aspect above also apply to this aspect.

In another aspect, a method for manufacturing a structural member at least partially configured for supporting bending loads in order to obtain a structural member as described in this disclosure is provided.

The method comprises providing a main blank comprising a region configurable for supporting bending loads and providing at least a first patch blank having a first patch blank edge and an opposite second patch blank edge. The method further comprises attaching the at least first patch blank to the main blank by continuous laser welding, optionally inside the first patch blank, substantially along the first patch blank edge and the second patch blank edge at least in the region configurable for supporting bending loads to form a patchwork blank, and forming the patchwork blank to obtain a structural member as disclosed herein.

This method enables to manufacture a structural member with enhanced behaviour as explained above. For instance, this method may enable the created patchwork to work as a single unity.

In general, this method may provide a faster and easier welding process. This is due to e.g. the fact that positioning of the spot welding gun for performing each spot weld is avoided and that no simultaneous access to the two welding sides is necessary.

In addition, considerations regarding the minimum overlapping distance, the minimum distance between spot welds or the number of spot welds are not necessary.

In this regard, this method allows attaching a patch along a first junction of a first side wall and a bottom of the main piece. This may not be possible with spot welding due to the relatively small size of the patch and the limitations of the technique such as a necessary minimum distance between the spot welds and a required minimum spot weld overlap region.

Also, continuous laser welding allows for patch geometry to be optimized. For example, different shapes of the patch may be used according to needs of design. More options in this regard are available by using this method than with e.g. spot welding.

All this may also allow a reduction of the size of the patch, which in turn may decrease the weight of the final structural member.

BRIEF DESCRIPTION OF THE DRAWINGS

Non-limiting examples of the present disclosure will be described in the following, with reference to the appended figures, in which.

The figures refer to example implementations and are only to be used as an aid for understanding the claimed subject matter, not for limiting it in any sense.

DETAILED DESCRIPTION OF EXAMPLES

Figure 1A:
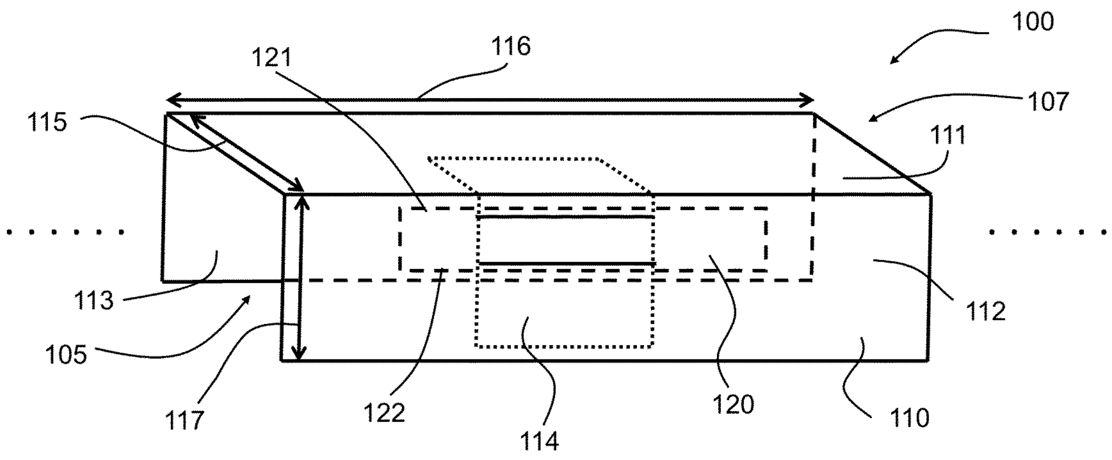
FIG. 1A schematically represents an example of a structural member for a vehicle at least partially configured for supporting bending loads.

FIG. 1A schematically represents a structural member for a vehicle at least partially configured for supporting bending loads 100. The structural member 100 comprises a main piece 110 with a substantially U-shaped cross-section comprising a bottom 111, a first side wall 112 and a second side wall 113. The main piece comprises a region configured for supporting bending loads 114.

Structural members in a framework of a vehicle may in general undergo and be subjected to a wide variety of loads. Loads may be due to the weight of the structure, acceleration and deceleration of the vehicles, vibrations caused by driving, and many other factors. However, specific structural members need to be designed and certified for a specific behaviour in case of a specific load situation, e.g. a crash or impact with a pole, a pedestrian, or another vehicle. Some structural members are expected to be subjected to bending loads (e.g. a bumper or a pillar), and they are thus designed specifically to withstand such bending loads. Other structural members (e.g. a crashbox) is instead expected to be submitted to compression loads, and is thus specifically designed to withstand such loads.

Structural members in the framework of a vehicle such as a car may be subjected to bending loads in its entirety. There are however structural members which are expected to be subjected to bending loads only in specific portions or regions thereof, or structural members have regions which are expected and designed to be submitted to high bending loads, whereas other regions are not expected or designed to be submitted to the same high bending loads. It is along those regions wherein bending loads are important that a patchwork blank or patchwork as provided herein may be of best use.

The dots in FIG. 1A indicate that the structural member 100 may comprise one or more additional pieces or elements that are not shown. These one or more additional pieces or elements are not limited in any way, e.g., in shape, size, shape of cross-section, material and/or how they are attached to main piece 110.

In this figure, and in other figures, the main piece is shown to be "hat-shaped" or to have a "U-shape" cross-section. It should be clear that in all these examples, the components or main pieces may include side flanges extending outwardly from the sidewalls.

The structural member further comprises a first patch 120. The first patch 120 has a first patch edge 121 and an opposite second patch edge 122. The first patch 120 is attached to the main piece 110 by continuous laser welding along the first patch edge 121 and the second patch edge 122 at least in the region configured for supporting bending loads 114.

The first patch 120 is attached in this and other examples to an inside 105 of the main piece 110 (patch represented by dashed lines). I.e. the patch is attached to the main blank, and the patchwork blank is deformed in such a way that the patch is located at an inside of the U-shaped. The first patch 120 may be attached to an outside 107 of the main piece 110 in other examples, as schematically illustrated in FIG. 2B.

In this and other examples, the first 121 and second 122 patch edges extend generally along a longitudinal direction 116 of the main piece 110. In some other examples, these patch edges 121, 122 may extend in other directions.

As indicated above, the assembly of a patch 120 attached to a main piece 110 may be termed as patchwork.

Attaching the first patch 120 to the main piece 110 by continuous laser welding at least in a region configured for supporting bending loads 114 may allow the patchwork to work as a single entity in the region configured for supporting bending loads 114. Thus, reinforcement of the main piece 110 due to attachment of the patch 120 can be improved, e.g. with respect to other techniques such as spot welding, with which seamless merging of a first patch 120 and a main piece 110 is not feasible.

Also, in case that the main piece 110 is subjected to bending loads, twisting or any force that tends to separate the main piece 110 and the first patch 120 during further processing and manufacturing, the main piece 110 and the first patch 120 will not be detached or at least the detachment will be less than with other patch attachment methods such as e.g. spot welding. The durability of the main piece 110, and thus of the structural member 100, may also be improved.

In addition, as limitations as explained above concerning spot welding (e.g. certain minimum distance between spot welds needed), the size of the patch 120 can be reduced, and the structural member 100 may be lighter.

Figure 1B:
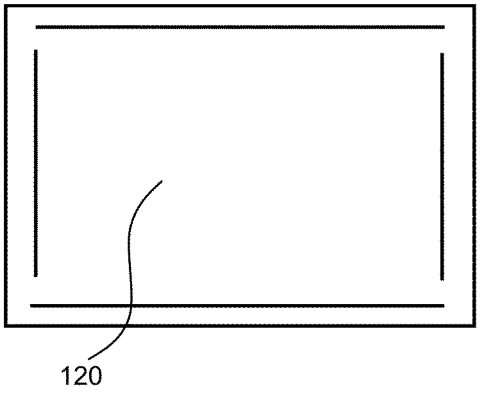
FIGS. 1B and 1C schematically illustrate two examples of attachment of a patch to a main piece of a structural member for a vehicle at least partially configured for supporting bending loads.

In some examples, all the edges of the patch 120 are attached to the main piece 110 by continuous laser welding at least in the region configured for supporting bending loads 114. In one example, such as in FIG. 1B, one or more discontinuities in the attachment along the perimeter of the patch 120 may be present. Such small discontinuities will not generally negatively affect the functioning and advantages provided by the present disclosure, as long as they are not provided in an area of impact or area of high bending loads. In another example, as shown in FIG. 10, attachment occurs along the entire perimeter of the patch 120 such that there are no discontinuities in the attachment.

This increases the level of improvement and reinforcement attained. That is to say, attaching the main piece 110 and the first patch 120 by continuous laser welding along the four edges of the first patch 120, especially along the entire perimeter of the first patch 120 as in FIG. 10, enhances the benefits commented herein.

It shall be understood that "entire perimeter" as used herein refers to the fact that substantially no discontinuities are present in the attachment, as in FIG. 10. This is in contrast with the situation in FIG. 1B, wherein attachment takes places along the perimeter of the patch, but one or more discontinuities are present in the attachment.

One or more discontinuities in the attachment by continuous laser welding may be present irrespective of the number of patch edges joined to the main piece 110 in this way.

The first patch 120 is depicted as being rectangular in FIG. 1A, but the first patch 120 may have any suitable shape. For instance, the first patch 120 may be any type of polygonal shape, e.g. a trapezoid.

The first patch 120 may extend over the bottom 111, the first side wall 112 and/or the second side wall 113. In some examples, such as in FIGS. 2A and 2B, the first patch 120 extends over the bottom and both side walls 111, 112 and 113. In some other examples, such as in FIGS. 3A and 3B, a patch extends over the bottom and one of the side walls 112, 113.

Figure 3A:
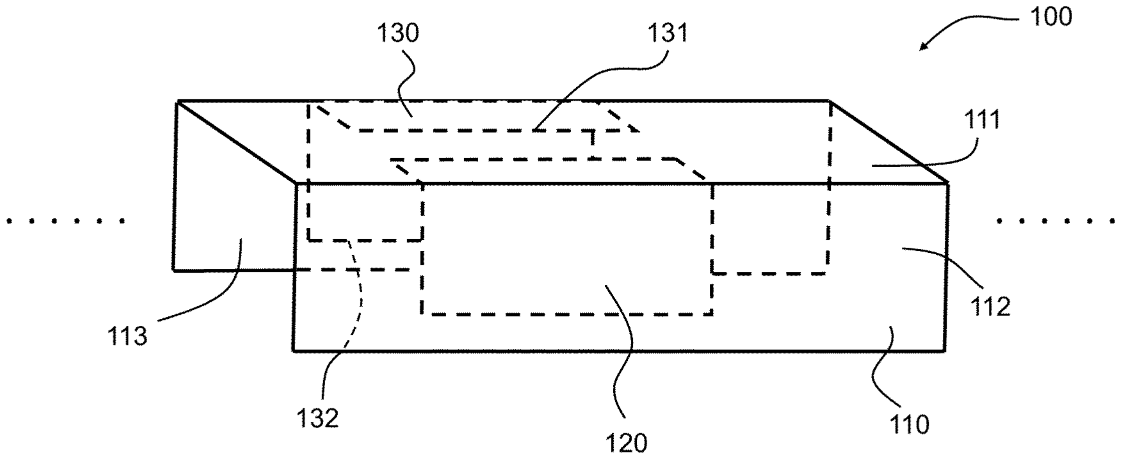
FIGS. 3A and 3B schematically illustrate two more examples of a structural member for a vehicle at least partially configured for supporting bending loads.
Figure 3B:
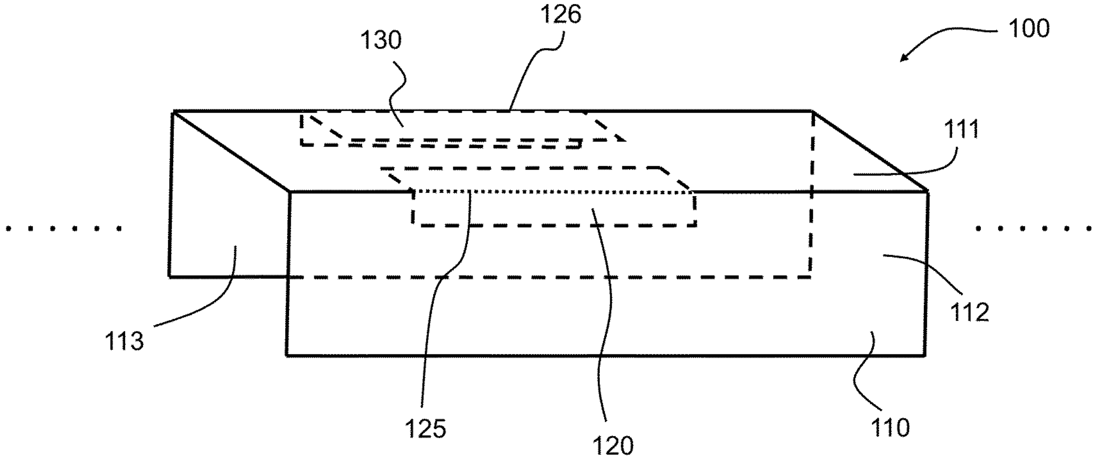

Having additional patches attached to the main piece may also be envisaged, see for instance FIGS. 3A and 3B. It is not precluded that, when two or more patches are present, overlapping among any of them may occur.

The region configured for supporting bending loads 114 may fully or partially extend over the main piece 110. For example, the region configured for supporting bending loads 114 partially extends over the main piece 110 in FIG. 1A.

It shall be understood that a region configured for supporting bending loads 114 is a region which has been arranged or set up to serve the purpose of supporting bending loads. Before the arrangement or set up, region 114 may be named region configurable for supporting bending loads (not shown). This arrangement or set up may comprise for instance performing any method, e.g. hot forming, to the region configurable for supporting bending loads.

The first patch 120 may partially or fully overlap with the region configured for supporting bending loads 114. The first patch 120 may not or partially or fully overlap with a region not configured for supporting bending loads. It shall be understood that a region not configured for supporting bending loads includes any region in the main piece 110 which, in contrast with region 114, is not configured for supporting bending loads. I.e. this may be a region of the component that in normal use is not expected to suffer bending loads. This portion may be used for joining the component to other parts of the framework of the vehicles.

For instance, as shown in FIG. 1A, the patch partially extends over a region of the main piece 110 which is configured for supporting bending loads 114 and partially extends over a region of the main piece 110 which is not configured for supporting bending loads. In an alternate example, the first patch 120 may extend over the entire region configured for supporting bending loads 114 and may fully/partially/not extend over a region not configured for supporting bending loads.

The first patch 120 may be attached by continuous laser welding to the main piece 110 at least over the region configured for supporting bending loads 114. Attachment between elements 110 and 120 may be performed in more locations than along the edges of the first patch 110. For instance, additional attachment of any type and following any pattern may be performed substantially over the centre of the first patch 120.

Additional attachment may also take place between elements 110 and 120 outside the region configured for supporting bending loads 114. For example, the main piece 110 and the first patch 120 may be attached via spot welding and/or continuous laser welding in a region which is not configured for supporting bending loads.

The main piece 110 and the first patch 120 may be made of any suitable material, such as ultra-high strength steel (UHSS). The main piece 110 and the first patch 120 may be made of the same steel, e.g. 22MnB5 steel, or different steels.

FIG. 1A indicates what is understood as "height" 117, "width" 115 and "length" 116 concerning the dimensions of the main piece 110.

Although depicted as substantially straight, the bottom 111, the first side wall 112 and the second sides wall 113 are not necessarily straight. For instance, the bottom 111 may be curved or bended in any way. This also applies to the side walls 112, 113. Each element 111, 112, 113 may have a curvature or bending which is equal or different from the curvature or bending of any of the other elements 111, 112, 113. In addition, side walls 112, 113 may not be symmetrical. For example, the height of the first side wall 112 may be different from the height of the second side wall 113. For instance, the height 117 along the length 116 of the first 112 and/or second 113 walls may also vary. For example, the width 115 of the bottom may be different from the height 117 of the first 112 and/or second 113 side walls. Other examples may include any combination of the above examples. The only limitation is that the person skilled in the art may recognize the main piece 110 as having a substantially U-shaped cross-section.

Figure 1C:
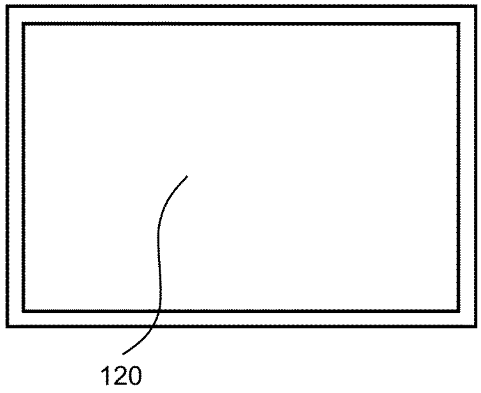
Figure 2A:
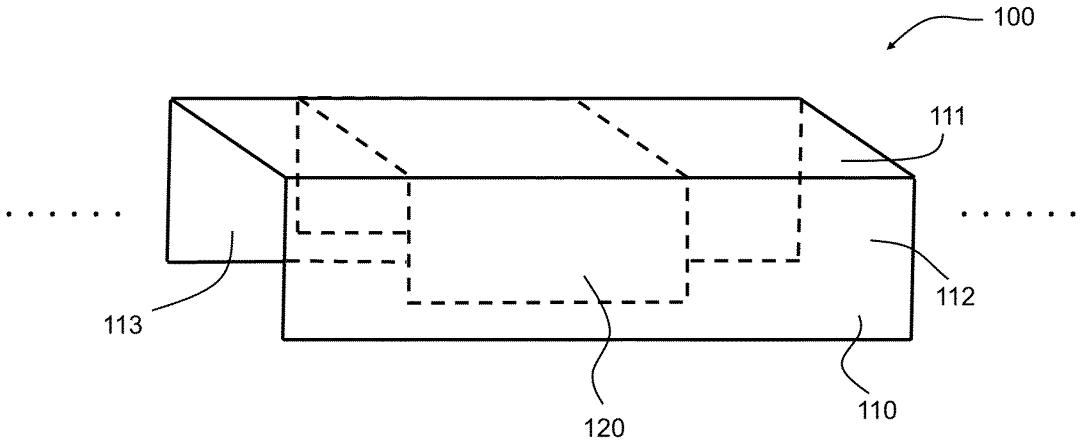
FIGS. 2A and 2B show a schematic representation of two additional examples of a structural member for a vehicle at least partially configured for supporting bending loads.
Figure 2B:
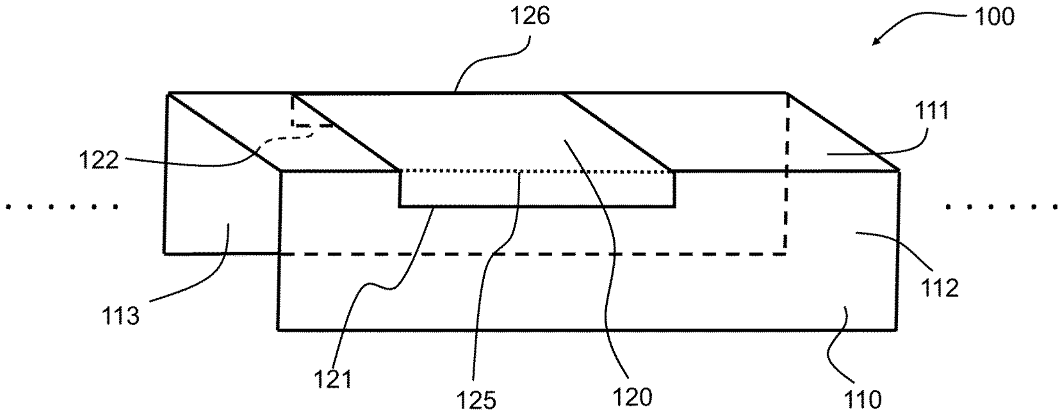

FIGS. 2A and 2B show a schematic representation of a structural member 100 for a vehicle at least partially configured for supporting bending loads according to an example. In FIGS. 2A and 2B, the first patch 120 extends over the bottom 111, the first side wall 112 and the second side wall 113 of the main piece 110. The first patch 120 is attached through continuous laser welding to at least a region configured for supporting bending loads 114 of the main piece 110 in any of the manners indicated above regarding FIG. 1. Thus, both configurations of the patch 120 and the main piece 110 benefit from the effects of attaching the patch 120 and the main piece 110 by continuous laser welding.

The configuration of FIG. 2A allows for a greater reinforcement in the area over which the patch 120 extends. For instance, the patch 120 may extend over the first side wall 112 at least 10%, and specifically 25% or more of a height of the first wall 112 and the first patch 120 may extend over the second side wall 113 at least 10%, and specifically 25% or more of a height of the second side wall 113. In FIG. 2A, the patch 120 may extend about 75% over each side wall 112, 113.

Due to continuous laser welding, the resistance of the patchwork to damages caused by bending loads, such as the patchwork being disassembled, may be higher in this case than in a configuration differing from the one shown in FIG. 2A only in the type of attachment method use, e.g. spot welding and/or laser stitching.

In the configuration of FIG. 2B, a first edge 121 of the first patch 120 substantially extends along a first junction 125 (schematically indicated as a dotted line) of the first side wall 112 and the bottom 111 of the main piece 110. Also, a second edge 122 of the first patch 120 extends along a second junction 126 of the second side wall 113 and the bottom 111 of the main piece 110. Extending along a junction may herein be understood as being in relatively close proximity of a fillet region at the intersection of the side walls and bottom of the U-shape. I.e. this may mean at less than 2 cm, or less than 1 cm of the edge of the fillet.

This configuration may enable an enhanced reinforcement and a reduced risk of rupture of the structural member 100 when being subjected to bending loads while reducing the weight of the structural member 100.

In particular, weight reduction may be higher than when using e.g. spot welding, as the limitations of spot welding as commented herein do not allow for welding as close to the junction 125, 126 of bottom 111 and side walls 112, 113 as continuous laser welding does. In some examples, the dimensions of the patch 120 in a direction substantially perpendicular to the length 116 of the main piece 110 (and substantially parallel to the height 117 and/or width 115 of the piece 110) may be reduced in at least 5 mm, optionally in at least 10 mm, per side 121, 122 of the patch 120 with respect to a patch to be spot welded to the main piece 110.

Further characteristics concerning weight reduction and deformation behaviour of the structural member 100 can be attained by using a second patch 130 in addition to the first patch 120, as shown in FIGS. 3A and 3B. The second patch 130 has a first patch edge 131 and an opposite second patch edge 132, and the second patch 130 is attached to the main piece 110 by continuous laser welding along the first patch edge 131 and the second patch edge 132 at least in a region 114 configured for supporting bending loads.

Like the first patch 120, the second patch 130, and in general any patch, may be attached to an inside 105 of the main piece 110 or may be attached to an outside 107 of the main piece 110. In FIGS. 3A and 3B, the patches 120, 130 are placed in an inside 105 of the main piece 110.

It is noted that labels 131 and 132 for referring to a first and second edges, respectively, of the second patch 130 in FIG. 3A are used for clarity purposes only, i.e. the disclosure, features and advantages regarding the first patch 120 in FIGS. 1A, 1B, 1C, 2A and 2B also apply to the second patch 130.

FIGS. 3A and 3B illustrate a first patch 120 extending over the bottom 111 and the first side wall 112 of the main piece 110 and a second patch 130 extending over the bottom 111 and the second side wall 113 of the main piece 110.

In particular, FIG. 3A shows the first patch 120 extending over the first side wall 112 more than over the bottom 111 of the main piece 110. Likewise, the second patch 130 extends over the second side wall 113 more than over the bottom 111 of the main piece 110.

This configuration has the advantages mentioned in relation to FIG. 2A, but with the additional benefit of further weight reduction.

Similar considerations apply to FIG. 3B, wherein the first patch 120 substantially extends along a first junction of the first side wall 112 and the bottom 111 of the main piece 110 and wherein the second patch 130 substantially extends along a second junction of the second side wall 113 and the bottom 111 of the main piece 110.

The configuration of FIG. 3B includes the advantages mentioned in relation to FIG. 2B, and additionally the advantage of further weight reduction.

As already noted, any number of patches extending over any of the side walls 112, 113 and/or the bottom 111 of the main piece 110 may be chosen depending on design criteria, e.g. concerning reinforcement, resistance to bending loads, resistance to risk of rupture and/or weight needs of the structural member 100.

Additionally, in any of the examples shown herein, the first 120 and/or second 130 patches may be made of a material which is more ductile than the main piece 110. In particular, the main piece 110 may be made of hardened steel and the first patch 120 and/or the second patch 130 may be made of a more ductile material than the hardened steel.

Examples of hardened steel include UHSS such as 22MnB5 steel or Usibor® 1500 or 2000, Usibor® being commercially available from Arcelor Mittal. The main piece 110 may include zinc-coated materials. The first 120 and/or second 130 patches may for instance be made of Ductibor® 500 or Ductibor® 1000, also being commercially available from Arcelor Mittal, or of CRL 340 LA.

In order to avoid the decarburization and the scale formation during the forming process, 22MnB5 may be presented with an aluminum-silicon coating. The composition of 22MnB5 is summarized below in weight percentages (rest is iron (Fe) and impurities):

| | |
|---|---|
| C | 0.20-0.25 |
| Si | 0.15-1.35 |
| Mn | 1.10-1.25 |
| P | <0.025 |
| S | <0.008 |
| Cr | 0.15-0.30 |
| Ti | 0.02-0.05 |
| B | 0.002-0.004 |
| N | <0.009 |

Several 22MnB5 steels are commercially available having a similar chemical composition. However, the exact amount of each of the components in a 22MnB5 steel may vary slightly from one manufacturer to another. Other ultra-high strength steels include e.g. BTR 165, which is commercially available from Benteler.

Usibor® 1500 is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor® 1500 is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Usibor® 2000 is another boron steel with even higher strength. After a hot stamping die quenching process, the yield strength of Usibor® 2000 may be 1400 MPa or more, and the ultimate tensile strength may be above 1800 MPa. A composition of Usibor® 2000 includes a maximum of 0.37% of carbon, a maximum of manganese of 1.4%, a maximum of 0.7% of silicon and a maximum of 0.005% of boron by weight.

Ductibor® and other softer steels on the other hand may also be used in hot forming, or in hot forming die quenching. However, these steels will not have a martensitic microstructure as a result. The resulting steel will have a lower ultimate tensile strength and a lower yield strength, but will have a higher elongation at break.

Ductibor® 400 may have an ultimate tensile strength of 450 MPa or more, Ductibor® 500 of 550 MPa or more, and Ductibor® 1000 of 1000 MPa or more.

CRL-340LA is a steel that is commercially available from SSAB. It is a high-strength low-alloy steel intended for general presswork, bending and forming. Its composition is outlined in the following (weight percentages).

C max 0.1%

Si max 0.040%

Mn max 1%

P max 0.030%

S max 0.025%

Al min 0.015%)

Nb+Ti max 0.1%

In examples, the patches are designed to have more ductile properties than the main piece. The patches may be made from any steel that is suitable for forming, including hot forming and cold forming and that provide the suitable mechanical properties after such a process. Ductibor®, CRL-340LA and similar steels, e.g. low alloy steel, may be suitable for "softer" patches.

The combination of a softer patch with a "harder" main piece allows the structural member 100 to absorb more energy in case of e.g. a collision. Another advantage may be that the rupture of the main piece 110 when subjected to a bending load is avoided or only occurs after significant deformation.

It shall be noted that this enhancement on the properties of the structural member 100 is particularly due to the effect arising from having the patch 120, 130 attached by continuous laser welding and the patch 120, 130 being more ductile than the main piece 110.

That is to say, if the patch 120, 130 is more ductile than the main piece 110 and the patchwork is attached by spot welding in the region configured for supporting bending loads 114, the properties of the structural member 100 will generally not be as good as with continuous laser welding since the patchwork would not work as a single unity. In particular, in case of impact and corresponding bending loads, local deformations can arise between spot welds and these deformations can result in local rupturing.

Similarly, if the patch 120, 130 is not more ductile than the main piece 110 and the patchwork is attached by continuous laser welding in the region configured for supporting bending loads 114, the properties of the structural member 100 may generally not be as good as with a patch 120, 130 that is more ductile than the main piece 110 as the patchwork would not be as much as ductile.

Figure 4:
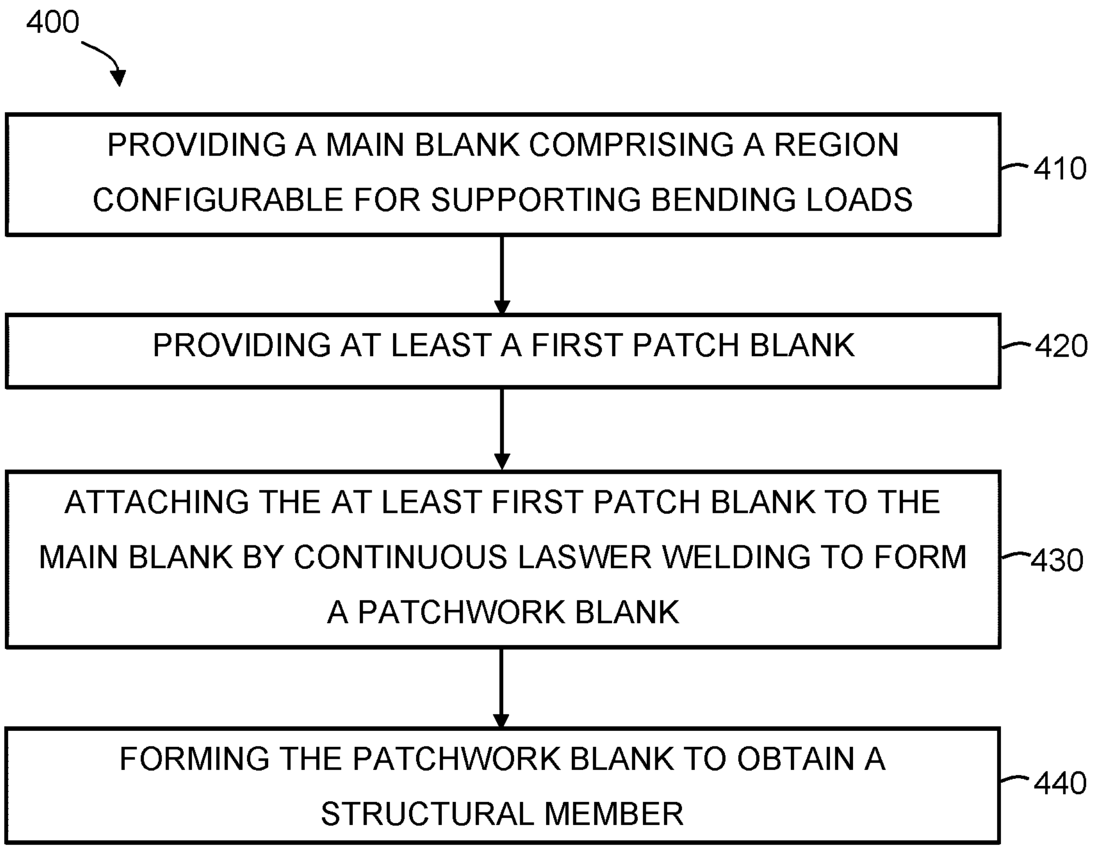
FIG. 4 is a flow chart of a method for manufacturing a structural member at least partially configured for supporting bending loads.

FIG. 4 shows a method 400 for manufacturing a structural member 100 at least partially configured for supporting bending loads as disclosed herein, for instance a structural member 100 as in FIG. 1A, 2A, 2B, 3A or 3B. The structural member 100 may include one or more patches 120 attached as in FIG. 1B or 10, or in any other configuration as disclosed herein.

The method includes the step 410 of providing a main blank comprising a region configurable for supporting bending loads.

The method further includes the step 420 of providing at least a first patch blank having a first patch blank edge and an opposite second patch blank edge. For instance, in some examples, only one patch blank is provided. In some other examples, two or more patch blanks are provided.

The main blank and the at least first patch blank may have e.g. same or different sizes, shapes and/or materials.

For instance, in some examples, the main blank and the at least first patch blank are both rectangular, have the same size and both the main blank and the patch blank are made of the same ultra-high strength steel (UHSS), e.g. Usibor® 1500.

In some other examples, the main blank is rectangular, the at least first patch blank is squared or rectangular, the main blank is bigger than the at least first patch blank, the main blank is made of hardenable steel, e.g. Usibor® 1500, and the at least first patch blank is made of a more ductile steel, e.g. Ductibor® 1000.

In general, the main blank and the at least first patch blank may be substantially planar. However, this may not be always the case. For example, the main blank and/or the at least first patch blank may have been bended in some way.

The method further includes the step 430 of attaching the at least first patch blank to the main blank by continuous laser welding substantially along the first patch blank edge and the second patch blank edge at least in the region configurable for supporting bending loads to form a patchwork blank, and specifically along all edges of the patch. Zero, one or more discontinuities may be provided when attaching the at least first patch blank.

As explained above, continuous laser welding enables the patchwork blank to work as a single unity.

The method further includes the step 430 of forming the patchwork blank to obtain the structural member 100 as disclosed herein with reference to any of FIGS. 1A, 1B, 1C, 2A, 2B, 3A and/or 3B.

Forming confers a desired shape to the patchwork. Due to forming, the obtained structural member 100 includes a main piece 110 with a substantially U-shaped cross section.

Forming may include any kind of forming, such as hot forming or cold forming. Forming may not only shape the patchwork, but forming may also provide additional properties, such as an increase of strength of the patchwork as e.g. in hot forming due to the change of microstructure of the steel.

Hot forming may include heating the patchwork blank above an austenization temperature, specifically above Ac3 for a minimum period of time, e.g. for a few minutes. The patchwork blank may then be transferred to a press in which the blank is deformed to form a component and at the same time is rapidly cooled ("quenched") to below 400° C., or specifically below 300° C. If a hardenable steel is used for the main piece and a softer steel is used for the patch, the main piece will have a high ultimate tensile strength, but by itself will be relatively brittle and allow for little elongation before break. The patch on the other hand will be more ductile, allowing for more elongation before break.

In some examples, forming and other subsequent processes like notching, trimming, and calibration may be carried out in a multistep apparatus combining different stations in the same press.

The same or similar steels as mentioned before may be used. In some examples, a hardenable steel main blank may be zinc-coated. In some examples, the steel may be quenched to obtain a martensitic microstructure, and in other examples the steel may be air hardenable or almost air hardenable.

If cold forming is used, in some examples, after forming, the component may be heated in a furnace and undergo a heat treatment involving quenching to obtain a desired microstructure and corresponding mechanical properties.

Also, this method may provide the further improvement of enabling the attachment of a patch blank along a first junction of a first side wall and a bottom of a main piece blank, as in FIG. 3B, which may not be generally possible with spot welding due to e.g. a relatively small size of the patch and the requirements of a minimum distance between the spot welds and a required minimum spot weld overlap region.

This also means that a desired effect linked to a patch 120, 130, e.g. reinforcement, is attained with a smaller size of the patch 120, 130, and thus a lighter structural member 100 may be obtained.

In addition, continuous laser welding may enable patch 120, 130 geometry optimization. The available shape of a patch blank may be more restricted with spot welding due to the already commented limitations of this technique. Thus, this method may allow to choose among more shapes for the patch blank than with spot welding. In general, any shape of the patch blank may be used as needed.

Also, the thickness of the patch blank may be chosen as required.

This method may include additional steps or actions. For instance, using seam tracking may be used for efficient continuous laser welding.

Figure 5A:
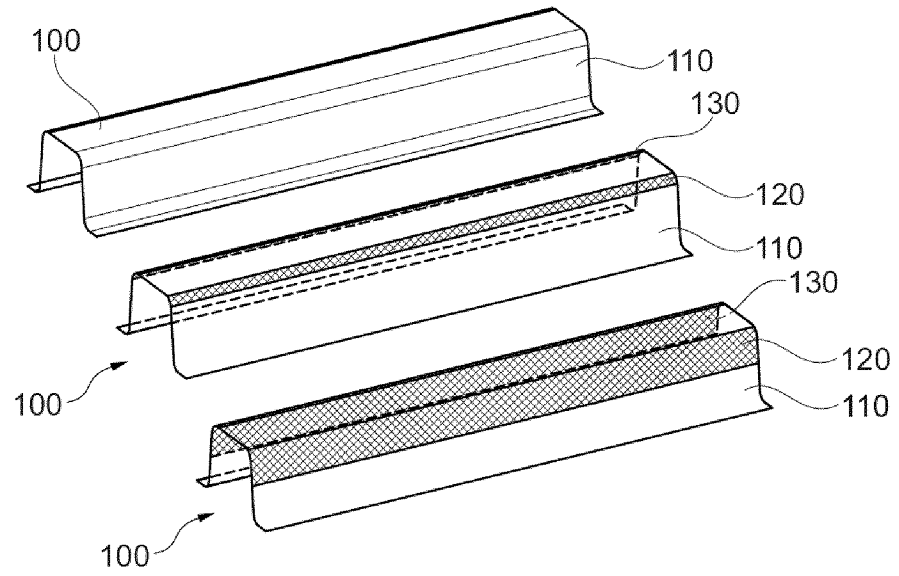
FIGS. 5A and 5B schematically illustrate examples of structural members and how they may deform under bending loads.
Figure 5B:
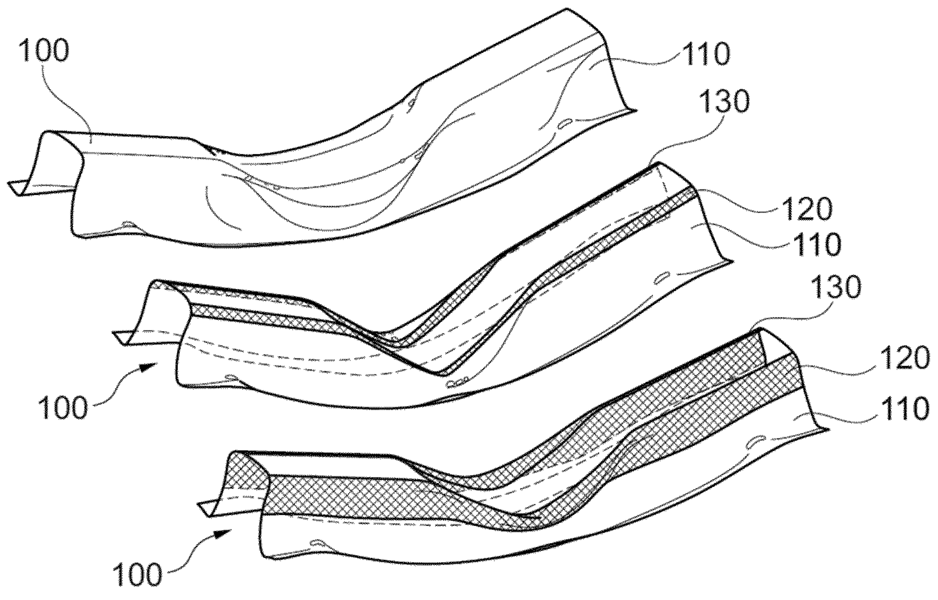

FIGS. 5A and 5B schematically illustrate U-shaped members and how they may deform under bending loads. The first example at the top is a fully hardened beam, the second example in the middle relates to a hardened main piece with a softer patch resembling the example of FIG. 3B, and the third example at the bottom is a hardened main piece with a softer patch resembling the example of FIG. 3A. In FIGS. 5A and 5B, the patches are attached to an inside 105 of the main piece 110.

In FIGS. 5A and 5B, the middle structural member is slightly heavier than the top structural member, and the bottom structural member is slightly heavier than the middle structural member.

FIG. 5B shows the deformation of the structural members of FIG. 5A under bending loads. Bending loads may include a component of force substantially perpendicular to the bottom 111 of the main piece 110.

It was found that the bottom example, i.e. the configuration resembling FIG. 3A was most beneficial in terms of energy absorption. If the patch is more ductile that the main piece, the rupture of the main piece may be completely avoided, in particular in the impact region, and greater deformation and energy absorption may be possible in this example.

Regarding the middle example, i.e. the configuration resembling FIG. 3B, breaking of the main piece may not be entirely avoided but may be substantially reduced. Rupture may also be steered in such a way as to occur in areas wherein there would be less risk or danger to vehicle occupants. Energy absorption may increase with respect to the main piece without patch, but it may not be as high as in the example at the bottom.

When the weight of the structural members in FIGS. 5A and 5B is normalized so that all the structural members weight the same, the performance of the middle and bottom structural members can both be satisfactory, and better than the reference structural member of fully hardened material without a patch (depending on the requirements).

When having the same weight, both the bottom and middle configurations may absorb a similar amount of energy under a same bending load, and they may avoid a problematic rupture of the main piece 110, especially in the impact region.

Terms such as "first" and "second" throughout this disclosure shall not be understood as indicators of order. Likewise, the labels in the figures do not limit the elements they accompany. That is to say, for instance a "first" patch edge may be any edge of a patch, and a "first" and "second" edges of the patch are any two different edges of the patch.

Throughout the present disclosure, reference has been made to "continuous" laser weld. Any suitable laser welding system may be used including e.g. gas lasers (e.g. $CO_2$ lasers), diode lasers and solid state lasers (such as Nd:YAG). Both remote laser welding (in which a laser may have a distance of e.g. half a meter to the weld zone) and traditional welding may be used.

"Continuous laser welding" may be understood throughout this disclosure as a welding technique using only a laser for welding. Continuous laser welding may be known as laser beam welding by a skilled person. That is to say, throughout this disclosure, the term continuous laser welding does not cover hybrid laser welding techniques, such as e.g. arc-laser hybrid welding. Continuous laser welding does not use a welding wire for welding either. In continuous laser welding, a laser beam may provide a concentrated heat source, allowing for narrow and deep welds. High welding rates and a high power density, e.g. in the order of 1 megawatt per square centimetre ($MW/cm^2$), may be obtained.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A structural member for a vehicle framework, the structural member being at least partially configured for supporting bending loads, comprising:

a main piece with a substantially U-shaped cross-section comprising a bottom, a first side wall and a second side wall; wherein the main piece comprises a region configured for supporting bending loads, and a first patch having a first patch edge and an opposite second patch edge, wherein the first patch is attached to the main piece by continuous laser welding inside the first patch substantially along the first patch edge and along the second patch edge at least in the region configured for supporting bending loads, wherein the main piece is made of hardened steel and wherein the first patch is made of a more ductile material than the hardened steel.

2. The structural member of claim 1, wherein the first patch is attached to the region configured for supporting bending loads of the main piece by continuous laser welding inside the first patch substantially along all the edges of the patch.

3. The structural member of claim 1, wherein the first patch extends over the bottom, the first side wall, and the second side wall of the main piece.

4. The structural member of claim 3, wherein the first patch extends over the first side wall at least 10% of a height of the first side wall, and the first patch extends over the second side wall at least 10% of a height of the second side wall.

5. The structural member of claim 1, wherein the first patch edge substantially extends along a first junction of the first side wall and the bottom portion of the main piece, and the second patch edge extends along a second junction of the second side wall and the bottom portion of the main piece.

6. The structural member of claim 1, further comprising:

a second patch having a third patch edge and an opposite fourth patch edge, wherein the second patch is attached to the main piece by continuous laser welding inside the second patch along the third patch edge and the fourth patch edge at least in the region configured for supporting bending loads.

7. The structural member of claim 6, wherein the first patch extends over the bottom and the first side wall of the main piece and the second patch extends over the bottom and the second side wall of the main piece.

8. The structural member of claim 6, wherein the first patch extends over the first side wall more than over the bottom and the second patch extends over the second side wall more than over the bottom.

9. The structural member of claim 6, wherein the first patch extends along a first junction of the first side wall and the bottom of the main piece, and the second patch extends along a second junction of the second side wall and the bottom of the main piece.

10. The structural member of claim 6, wherein the second patch is made of a more ductile material than the hardened steel of the main piece.

11. A method for manufacturing a structural member at least partially configured for supporting bending loads according to claim 1, the method comprising:

providing a main blank comprising a region configurable for supporting bending loads;

providing at least a first patch blank having a first patch blank edge and an opposite second patch blank edge;

attaching the at least first patch blank to the main blank by continuous laser welding inside the first patch blank substantially along the first patch blank edge and the second patch blank edge at least in the region configurable for supporting bending loads to form a patchwork blank; and forming the patchwork blank to obtain the structural member of claim 1.

12. The method of claim 11, wherein forming includes hot forming.

13. The method of claim 11, wherein forming includes cold forming.

14. The method of claim 13, wherein the structural member is heated and hardened after cold forming.

15. The method of claim 11, further comprising the use of seam tracking during continuous laser welding.

16. The method of claim 12, wherein prior to hot forming the patchwork blank is heated by a furnace.

17. The structural member of claim 1, wherein the structural member is a B-pillar or A-pillar.

18. The structural member of claim 1, wherein the main piece is made of hardened 22MnB5 steel.

19. A structural member for a vehicle framework, the structural member being at least partially configured for supporting bending loads, comprising:

a main piece with a substantially U-shaped cross-section comprising a bottom, a first side wall and a second side wall; wherein the main piece comprises a region configured for supporting bending loads, and a first patch having a first patch edge and an opposite second patch edge, wherein the first patch is attached to the main piece by continuous laser welding inside the first patch substantially along all edges of the patch at least in the region configured for supporting bending loads, wherein the main piece is made of hardened steel and wherein the first patch is made of a more ductile material than the hardened steel, and wherein the first patch extends over the bottom, the first side wall and the second side wall of the main piece.

20. The structural member of claim 19, wherein the main piece is made of hardened 22MnB5 steel.

* * * * *